T. W. VARLEY AND W. C. NEIN.
AUTOMATIC TRAIN CONTROL.
APPLICATION FILED JAN. 27, 1917.
1,397,024.
Patented Nov. 15, 1921.
4 SHEETS—SHEET 4.
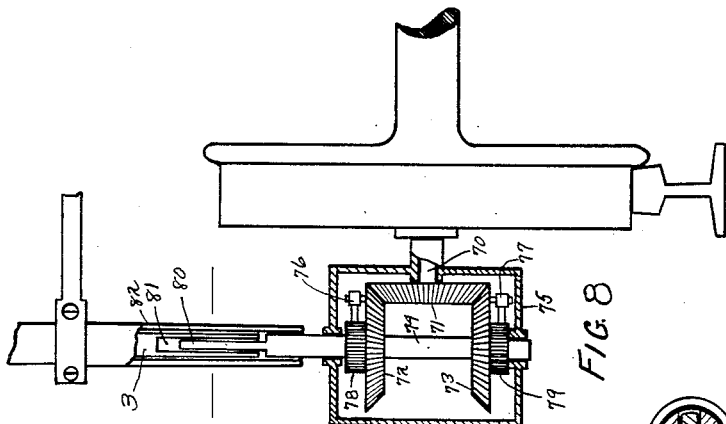
FIG. 9.
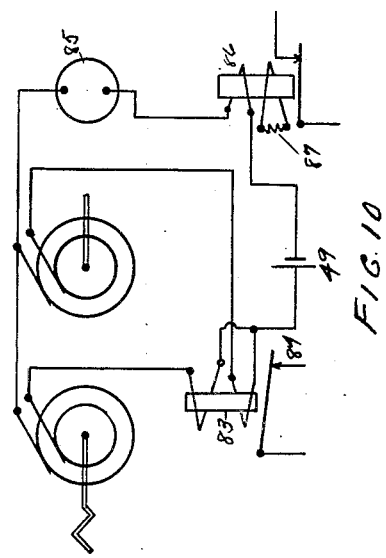
Inventor
Thomas W. Varley
William C. Nein
by their Attorney

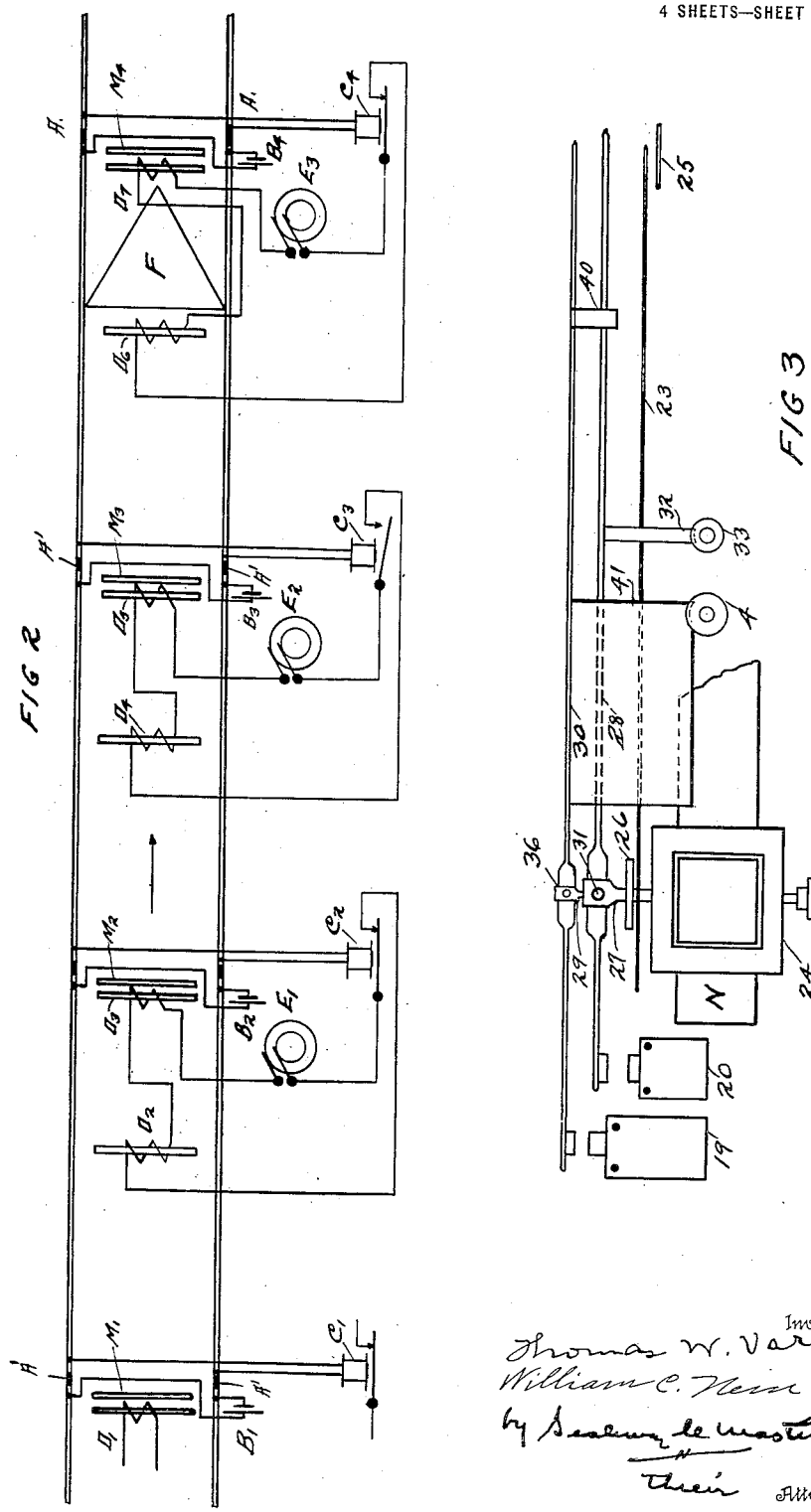

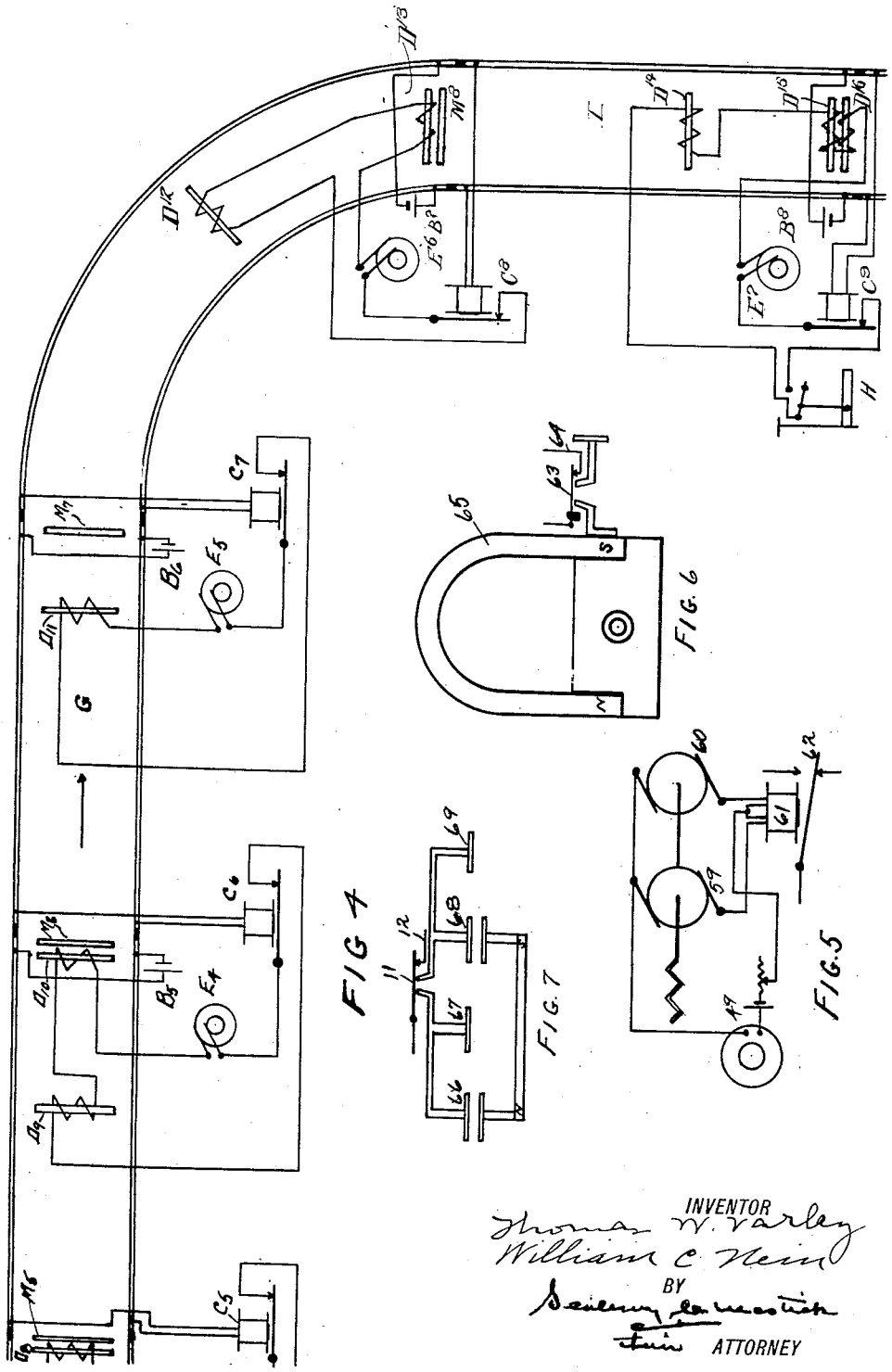

UNITED STATES PATENT OFFICE.

THOMAS W. VARLEY AND WILLIAM C. NEIN, OF NEW YORK, N. Y.

AUTOMATIC TRAIN CONTROL.

1,397,024.   Specification of Letters Patent.   Patented Nov. 15, 1921.

Application filed January 27, 1917. Serial No. 144,836.

*To all whom it may concern:*

Be it known that we, THOMAS W. VARLEY and WILLIAM C. NEIN, both citizens of the United States of America, and residents of the borough of Manhattan and borough of the Bronx, city of New York, State of New York, respectively, have invented certain new and useful Improvements in Automatic Train Controls, of which the following is a specification.

This invention relates to devices whereby the train or vehicle upon the absence of "clear" conditions is compelled to be slowed down to a predetermined maximum speed or to be stopped. Suitable signals may also be included in the equipment to indicate to the driver of the vehicle existing conditions.

According to the present invention the desired control is effected by means of magnets along the track, the field of each of which affects a relay upon the vehicle which in turn controls the current of a vehicle circuit as the vehicle passes each magnet.

The magnets are controlled according to the existing conditions so that the relay and the vehicle circuit current vary in response to these conditions and the control is exerted accordingly.

The magnets along the track may comprise permanent and electromagnets, the absence of magnetic fields in the latter indicating absence of "clear" conditions, which in turn results in no action of the vehicle relay and hence no current in the vehicle circuit, the vehicle in turn responding to these conditions. The action of the permanent magnets is utilized to control the speed of the vehicle in such cases where an electromagnet if used, would never be deënergized as will be pointed out hereinafter.

It is the main object of the present invention to enforce a speed control of the vehicle in accordance with track conditions and primarily to fix different limiting speeds for the vehicle.

It is a further object of the invention to provide means for bringing the vehicle to a stop in case the driver does not heed the conditions of the track magnets as to their failure to transfer magnetism to the vehicle relay.

A further object of the invention is to provide means for causing the stopping of the vehicle in case of derangement or failure to operate of the controlling apparatus upon the vehicle.

Other and ancillary objects of the invention will appear hereinafter.

In the accompanying drawings which illustrate a method of carrying out the invention, Figure 1 is a diagrammatic view of the vehicle controlling circuits and actuating mechanism;

Fig. 2 is a diagrammatic view showing the arrangement of track magnets and circuits;

Fig. 3 is a diagrammatic side view of certain of the circuits shown in Fig. 1 and giving details of a speed indicating and controlling apparatus, as will be hereinafter shown;

Fig. 4 is a diagrammatic view of the arrangement of track magnets and circuits as applied to the control of the speed of the vehicle on a curve and for a position stop;

Fig. 5 is a diagrammatic view of a modified form of generator or two armature generator and circuits designed to give protection in case of a generator failure, as hereinafter described;

Fig. 6 is an elevation of a form of protective device to detect failures of magnetism, as hereinafter described;

Fig. 7 shows a modified form of collector for receiving the magnetism from the track magnets;

Fig. 8 is a detail view of the uni-directional device for conveying movement from the wheel axle to an actuated worm, parts being shown in section;

Fig. 9 is a cross-sectional view of the parts shown in Fig. 8, along the line A—B; and Fig. 10 is a diagrammatic view showing two alternating current generators in place of two direct current generators, and is designed to illustrate an arrangement which may be substituted for that shown in Fig. 5.

Similar letters and numerals of reference indicate similar parts throughout the several views.

Figure 1:
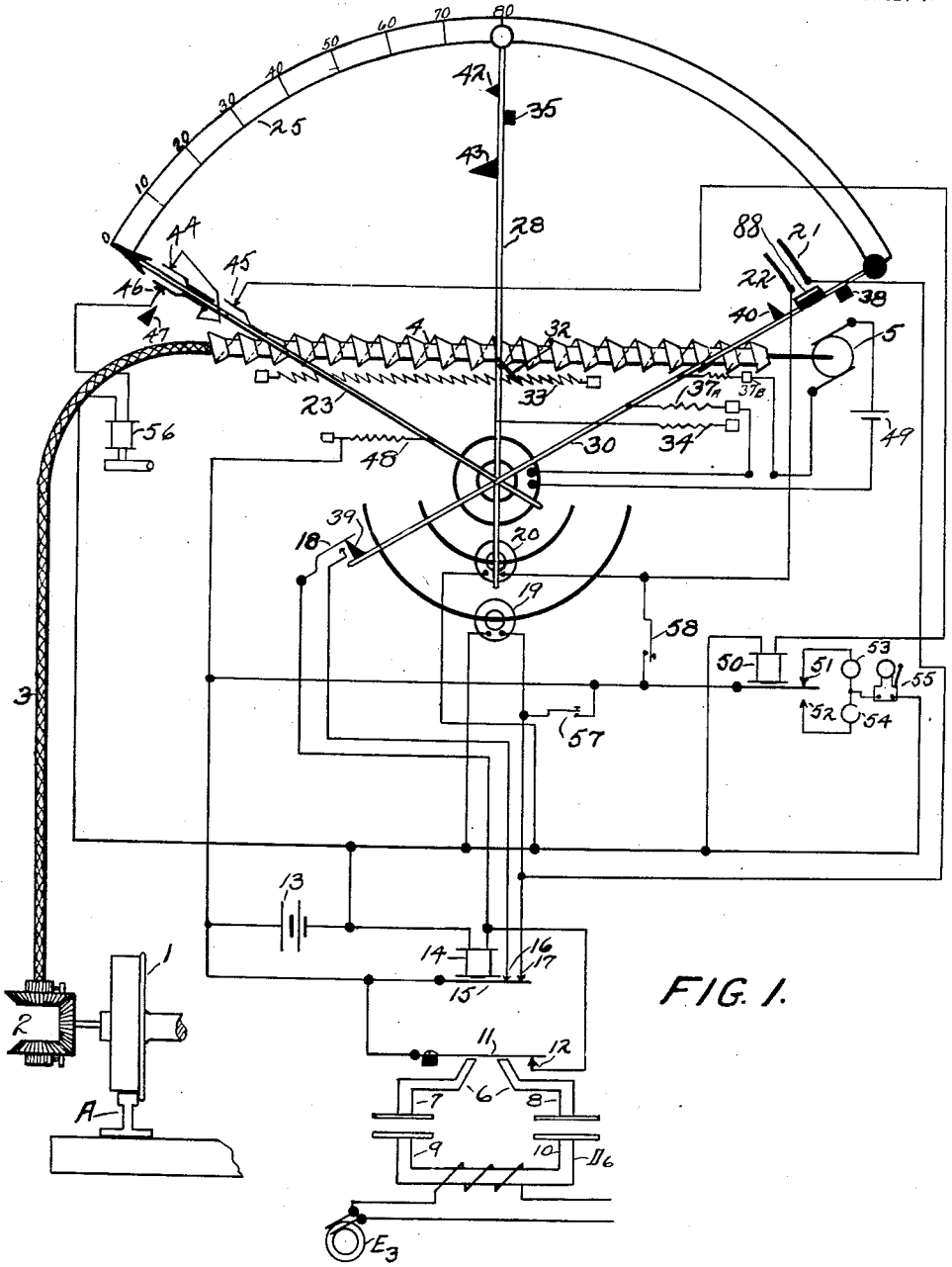

Referring first to Figs. 1, 2 and 3, A indicates one of the usual rails to a railroad track upon which the vehicle runs. The track is divided into blocks by electrical insulation means $A_1$, as shown in Fig. 2. Across the rails in each block are respectively connected batteries $B_1$, $B_2$, $B_3$ and $B_4$ and track relays $C_1$, $C_2$, $C_3$ and $C_4$. Normally the track relay of a block is energized by the battery of that block and maintains its contacts closed. When, however, the relay is short circuited by a vehicle upon the rails within the block, the track relay will let go and its contacts will open. The track relay of each block, as for instance $C_3$, has its contacts in a circuit including the coils of the electromagnets, such as $D_4$ and $D_5$ of the preceding block and a source of electro-motive force such as $E_2$. So long as the track relay contacts are closed the electromagnets are energized but they are deënergized with the deënergization of the track relay caused by the opening of its contacts. Similarly the block preceding and succeeding that containing the electromagnets $D_4$ and $D_5$ contain electromagnets $D_2$ and $D_3$ and $D_6$ and $D_7$ respectively. Succeeding the electromagnets $D_1$, $D_3$, $D_5$ and $D_7$ are permanent magnets $M_1$, $M_2$, $M_3$ and $M_4$ etc., as indicated.

F indicates a vehicle on the track. The magnetic fields of the magnets along the track act magnetically upon a relay carried by the vehicle as it passes over the magnets along the track, whereby the engineer or driver of the vehicle is signaled and a reduction of speed or the stopping of the vehicle under certain conditions of danger, or absence of "clear" conditions, or on passing around curves, is enforced. As the vehicle relay passes through the field of a magnet in the track the vehicle relay will close a circuit on the vehicle, the action of which closing is described hereinafter. The magnets in the track may be spaced as desired.

The arrow in Fig. 2 indicates the direction of movement of the vehicle along the track.

Referring now more particularly to Fig. 1, 1 indicates the usual car wheel which is shown as resting on the rail A and as carrying the uni-directional driving device 2, which in turn drives the flexible shaft 3, connected to the worm 4, in turn driving the generator 5, the generator being placed at the end of the driven parts to insure mechanical continuity. 6 indicates a relay carried by the vehicle provided with collecting pole pieces 7 and 8. 9 and 10 indicate corresponding pole pieces on one of the electromagnets in the track, such as $D_6$ for example. As the relay 6 passes through the field of magnet $D_6$ for example, which has been energized by source $E_3$, the lines of force passing through the pole pieces 7 and 8 of relay 6 act upon the tongue 11 of the relay, closing it against contact 12. The tongue and its contact 12 are connected in circuit with a battery 13 and a stick relay 14, the relay 14 with its armature 15 controlling contacts 16 and 17. Contacts 16 in coöperation with contact 18 controls the stick action of the relay. Contact 17 is in circuit with battery 13 and relay 19 of the speed control device, the function of the relay 19 being described hereinafter. Contact 17 and battery 13 are also in circuit with relay 20 through contacts 21 and 22 of the speed control device.

The speed control device comprises a speed indicating hand 23 fixed to movable element 24, such as the movable element of a D'Arsonval type of instrument similar to a volt meter. This hand 23 moves over a dial 25 which latter is calibrated to read in terms of speed, such as miles per hour. One end of the speed indicating hand 23 is pivoted in a bridge 26 (Fig. 3) in the usual manner. A bracket 27 carrying a pivoted speed limit hand 28 is also pivoted in bridge 26, speed limit hand 28 being capable of being turned in planes at right angles to each other. Pivoted in the bracket 27 is another bracket 29 carrying a pivoted stop hand 30, the stop hand 30 being also capable of being turned in planes at right angles to each other. The speed limit hand 28 may thus be turned about the pivot 31 by means of the electromagnet or relay 20, which when energized pulls down upon the tail of the arm 28, the lifting of the front part of the arm 28 disengaging the pawl 32 from a stationary ratchet 33 and permitting the spring 34 to draw the hand 28 against a stop 35, it being understood that the magnet or relay 20 will hold the tail of the speed limit hand 28 down without restricting its freedom of lateral movement. The stop hand 30 may be turned about the pivot 36 in a similar way by means of the electromagnet or relay 19, which when energized pulls down on the tail of the arm 30, thus disengaging the projection 41 carried by arm 30 from the rotatable worm 4, permitting the springs $37_A$ and $37_B$ to draw the stop hand 30 against its stop 38, the magnet 19 permitting the stop hand 30 to act similarly to the action of magnet 20 on speed limit hand 28, so that stop hand 30 has freedom of lateral movement. The tail end of the stop hand 30 carries a horizontal projection 39 of insulating material, which is adapted to open contact 18 when the hand 30 is in its extreme right-hand position as shown in Fig. 1. When the projection 41 on the hand 30 engages the worm 4, the hand being near its extreme right-hand position, the hand closes the contacts 21 and 22, the function of which will be hereinafter described. Stop hand 30 also carries a projection 40 of insulating material enabling the hand 30 to push the speed limit hand 28 ahead of it while traveling down the scale, the pawl 32 permitting the hand 28 to be pushed over the ratchet 33. The projection 41 on the stop hand 30 engages the worm 4 when the magnet 19 is deënergized. The speed limit hand 28 carries two projections 42 and 43 respectively, of insulating material, adapted to open contacts 44 and 45 respectively, carried by speed indicating hand 23. Speed indicating hand 23 carries a contact 46 adapted to be opened by a stationary projection 47 as the hand 23 moves toward the left, the cause of this motion to the left being hereinafter described.

The spring 48 controls the movement of the speed indicating hand 23. In the circuit of the movable element or coil 24 to which speed indicating hand 23 is fixed is a battery 49, springs $37_A$, $37_B$ of stop hand 30 and the generator 5, the battery 49 holding the speed indicating hand 23 at zero on the dial 25 under normal conditions and with no electro-motive force from the generator. A breaking of the circuit from the battery 49 through the coil 24, or a lowering of the current through the coil 24 permits the spring 48 to draw back the speed indicating hand 23 to the extreme left, when the projection 47 will open the contact 46. The opening of contact 46 will apply the air-brakes on the vehicle in a manner to be described hereinafter.

In a circuit including battery 13, spring 48 of speed indicating hand 23 and contact 45 on hand 23 is a relay 50, the opening and closing of the current through it in turn opening and closing contacts 51 and 52 respectively, controlling circuits through lamps 53 and 54 respectively and bell 55 to battery 13. In a circuit including battery 13, spring 48 of hand 23 and contacts 44 and 46 on hand 23 is a relay 56 controlling the air-brakes on the vehicle.

Controlling the circuit from the battery 13 to relay 19 is a key 57 designed to take the place of the contact 17 on relay 14 for restoring relay 19 by hand. Controlling the circuit from battery 13 to relay 20 is a key 58 which is designed to take the place of the contact 17 and contacts 21 and 22 for restoring relay 20 by hand.

Referring now to Fig. 4 the track circuit conditions are similar to those shown in Fig. 2, excepting that the spacing of the magnets is different in order to provide for a lowering of the maximum speed from say 80 miles per hour to say 30 miles per hour to limit the speed in passing around a curve. Track relays $C_5$, $C_6$, $C_7$ etc. in conjunction with batteries $B_5$, $B_6$, $B_7$ etc. are controlled by the track conditions as before and in turn control electromagnets $D_8$, $D_9$, $D_{10}$, $D_{11}$, etc. with their sources of electro-motive force $E_4$, $E_5$, $E_6$, etc. The permanent magnets $M_5$, $M_6$, $M_7$, $M_8$, etc. are placed as before at the ends of the blocks with the exception that the electromagnet $D_{16}$ takes the place of a permanent magnet to control a positive stopping of the vehicle at the end of its block, thus illustrating the use of the system as an absolute stop. The permanent magnets are used to give a premissive entering of a vehicle into an occupied block at a lower permissive speed, as will be described hereinafter. In one of the blocks illustrated, as G, the second electromagnet is omitted for reasons which will be set forth hereinafter. The arrow on Fig. 4 as on Fig. 2, indicates the direction of travel of the vehicle. A semaphore arm as shown at H (Fig. 4) is designed to act as a home signal to control the source of electro-motive force $E_7$ and its magnets $D_{14}$, $D_{15}$ and $D_{16}$. As before the spacing of the magnets along the track may be as desired.

Fig. 5 illustrates the use of two generators or of two armatures on one generator, or one armature with two commutators having two independent windings in place of the single generator 5 (Fig. 1) for the purpose of detecting a short circuit in the windings of the armature. From the battery 49 (Fig. 1 and Fig. 5) the current passes to the armatures 59 and 60 by way of the relay 61, the windings of the relay 61 being opposed so that normally the current from the battery through the relay and armatures and the movable coil 24 of the speed indicating hand 23 has no action upon the relay. If, however, one armature becomes short circuited or open circuited, the currents through the relay 61 become unbalanced, causing the tongue of the relay 61 to open the contact 62, which contact being in the circuit of magnet 56 will cause magnet 56 to actuate the air-brakes of the vehicle.

Fig. 6 illustrates a detecting device consisting of a vibrating tongue 63 controlling a contact 64 which contact is in the circuit of the magnet 56 and is normally closed. A loss of magnetism in the permanent magnet 65 will permit the contact 64 to open, thus permitting magnet 56 to actuate the air-brakes. Magnet 65 may furnish the field for the generator 5 as in the usual magneto generator.

Fig. 7 illustrates a modified form of the collecting pole pieces carried by the vehicle where more than one pair of collecting arms are used, as may be found necessary when the track magnet is energized by alternating current, due to the speed of the collecting arm passing the track magnet in combination with the alternating impulses from the track magnet. As illustrated in Fig. 7 the modification is shown as comprising four arms 66, 67, 68 and 69. If the speed of the vehicle is such that the flux is zero while the arms 66 and 68 are passing, the flux would be at a maximum, while the arms 67 and 69 were passing. At any slower speed of the vehicle one or more impulses would be received by either of the pair of arms, insuring the attraction of the tongue 11 and the closing of the contact 12. It is understood that the parts may be reversed in that the track magnet may be provided with four arms and the vehicle with two and that any suitable number of arms may be used.

Fig. 8 illustrates a form of the uni-directional device 2 which is here shown as comprising a shaft or wheel axle 70, carrying the gear wheel 71 meshing with gears 72 and 73 loosely mounted and freely rotatable on shaft 74 mounted in bearings in housing 75. Each of gears 72 and 73 carries a pawl 76 and 77 respectively, taking into ratchets 78 and 79 respectively fast on shaft 74. The housing 75 is loosely mounted on shaft 70. Shaft 74 is provided with a tongue 80 entering a slot 81 in the end of flexible shaft 3. The housing 82 of shaft 3 prevents tongue 80 from falling out laterally and restrains housing 75 from rotating with the shaft or wheel axle 70, while shaft 74 is free to rotate. Should the housing 75 and the parts mounted within it break off from the wheel axle, they may drop freely to the ground, tongue 80 slipping out of slot 81 leaving the flexible shaft 3 free and permitting generator 5 to run away, thus decreasing the current through the movable coil 24 on which speed indicating hand 23 is mounted and permitting the speed indicating hand to travel backward against stop 47 thereby opening contact 46 and cutting off current from relay 56, thus causing the application of the air-brakes.

Fig. 10 shows the use of two alternating current generators in place of two direct current generators, as shown in Fig. 5. In this case each generator is mechanically driven from opposite sides of the vehicle without the use of any uni-directional device, the generators being normally connected in synchronism and if thrown out of synchronism due to a disconnection from the driving wheel of the vehicle, or if either is open circuited, or if either is short circuited, the differential relay 83 will be acted upon by the battery 49, causing the contact 84 to open and, this contact being in the circuit of the magnet 56, the air-brakes on the vehicle will be actuated. The alternating current from the generators is designed to act upon an indicator 85 which takes the place of the movable coil 24 (Fig. 1) and serves the same purpose, with the exception that it may be an induction type of instrument or a dynamometer type in place of the D'Arsonval type. In the same circuit as the battery 49 and indicator 85 and the generators is a relay 86 which is used to detect an opening of the circuit, the contacts being normally closed and also in the circuit of the magnet 56. Around the core of the relay 86 is a short circuited winding 87 to prevent the action of the alternating current of the generators from affecting it. It will be understood that these generators may be of the induction type instead of the form shown.

Referring to Figs. 1 and 3 the operation of the device will be understood by the following explanation: The vehicle wheel 1 drives the flexible shaft 3 through the uni-directional device 2, shaft 3 in turn driving the worm 4 which actuates the generator 5. The battery 49 tends to drive the generator 5 in a backward direction but is prevented from doing so by its connection with wheel 70 1, any break in the mechanism between generator 5 and uni-directional device 2, permitting the generator to rotate freely and to set up a counter electro-motive force which will reduce the current of battery 49 and weaken the current in movable coil 24 carrying speed indicating hand 23, thus permitting spring 48 to pull hand 23 backward against stop 47 and opening contact 46 which controls the current through relay 56 and thus applies the air-brakes of the vehicle. The integrity of the mechanical connections from the generator to the wheel is thus insured.

The worm 4 is of ratchet formation to permit it to rotate backward and slip by stop hand 30 in case the hand is against its stop 38. Stop hand 30 is normally drawn into engagement with worm 4 by springs $37_A$ and $37_B$ and travels over the scale from right to left. It is lifted out of engagement with the worm 4 by the relay 19 and when lifted out is restored by the springs to its extreme right-hand position against stop 38. The energizing of the relay 19 is caused by the closing of contact 17 of stick relay 14. As the vehicle relay 6 passes over a magnet in the track it closes contact 12 which in turn energizes relay 14, thus closing contact 17. As relay 14 is a stick relay, when it closes contact 16 if contact 18 is also closed, the relay remains closed. The restoring of stop hand 30 to its right-hand position opens contact 18 through the influence of projection 39 and unlocks relay 14. If the stop hand 30 is in position to close the contacts 21 and 22 the relay 20 is energized at the same time as relay 19. Relay 20 controls the speed limit hand 28 which hand is normally drawn into engagement with ratchet 33 through pawl 32 by the action of spring 34. Relay or magnet 20 lifts hand 28 out of engagement with the ratchet and spring 34 restores the hand 28 to its position against the stop 35. As stop hand 30 moves over the dial 25 toward the left and reaches the speed limit hand 28, it pushes the speed limit hand 28 ahead of it and when stop hand 30 is restored to its original position speed limit hand 28 is left in the position to which it has been pushed, this feature being taken advantage of to hold the speed at some particular maximum value, the speed limit hand 28 not being restored except when two successive signals or impulses are received from the track magnet, the first impulse tending to restore stop hand 30 to its original position and the second impulse being received when stop hand 30 passes over contacts 21 and 22 in its path of movement toward its stop 38 and by closing contacts 21 and 22 restores speed limit hand 28. The restoring of speed limit hand 28 is thus controlled by the receiving of two consecutive and specially placed impulses from the track. Speed limit hand 28 is used to control the speed of the train and limits the speed indicating hand 23 to a position between the position of speed limit hand 28 and the zero position on the dial 25. The approach of speed indicating hand 23 toward speed limit hand 28 will bring projection 43 on hand 28 into contact with contact 45 on hand 23, thus opening the circuit through relay 50 which in turn will put out lamp 53 and light lamp 54, at the same time ringing bell 55 and giving a warning signal to reduce speed. A further advance of speed indicating hand 23 toward speed limit hand 28 will open contact 44 on hand 23 due to the impact of projection 42 on hand 28 and open the circuit through relay 56 and thus apply the airbrakes on the vehicle.

As the speed of the vehicle increases, generator 5 has an electro-motive force generated in it in the same direction as battery 49, increasing the current through movable coil 24 of the speed indicator and causing the hand 23 to travel toward the right proportional to the speed of the vehicle in the well known manner. Any magnet along the track whether a permanent magnet, a direct current, or an alternating current electromagnet will cause the contact 12 of relay 6 to close as relay 6 passes over the magnet. Contacts 21 and 22 may be extended in length or changed in position as desired.

Referring to Fig. 2, the action of the track magnets is as follows: The vehicle approaching from the left and passing energized electromagnet $D_1$ restores stop hand 30 to the right and later when passing permanent magnet $M_1$, stop hand 30 is again restored to the right at the same time as speed limit hand 28 is restored, due to the proper spacing of the magnets as has been previously described. In passing magnet $M_1$, stop hand 30 starts over the dial 25 to the left and reaches about the position of speed limit hand 28 as the vehicle passes over the energized magnet $D_2$ when hand 30 is again restored to the right. Hand 30 is also again restored as the vehicle passes over magnets $D_3$ and $M_2$ respectively. As the vehicle passes over deënergized magnet $D_4$ due to the block ahead being occupied, no impulse is received and stop hand 30 keeps on traveling to the left carrying speed limit hand 28 with it and reaches a position of about ten miles per hour as the vehicle passes deënergized magnet $D_5$ and a short distance later magnet $M_3$. An impulse is received at magnet $M_3$ restoring hand 30 to its right-hand position but leaving speed limit hand 28 to control the speed, thus permitting the vehicle to enter into the occupied block at a permissive speed of say ten miles per hour, this action being repeated in each block and permitting the second vehicle to follow the first vehicle into all the succeeding blocks indefinitely.

Referring to Fig. 4 illustrating the control of speed on curves, the vehicle upon passing energized magnet $D_{10}$ and permanent magnet $M_6$, hands 30 and 28 are both restored to their respective right-hand positions as usual for full speed condition. Hand 30 again starts to the left and is not restored until it has carried hand 28 to a position on the dial 25 of say thirty miles per hour, due to the special spacing of magnet $D_{11}$, which if energized restores hand 30 leaving hand 28 to control the vehicle at this reduced speed. As the vehicle proceeds it passes over the magnet $M_7$ but as an electromagnet has been omitted just previous to permanent magnet $M_7$, hand 30 is again restored to its right hand position, still leaving hand 28 at its reduced speed position, the vehicle passing on around the curve over magnet $D_{12}$ which again restores hand 30 and over magnet $D_{13}$ which again restores hand 30 and a short distance farther the vehicle passes over magnet $M_8$ which restores both hands 28 and 30 to their full speed positions. This full speed position holds until the vehicle passes into a block shown as I controlled by the home signal or semaphore H where the vehicle is brought to an absolute stop due to the displacing of a permanent magnet by an electromagnet, as shown at $D_{16}$ and the absence of an impulse being received from either of the electromagnets $D_{14}$, $D_{15}$ or $D_{16}$. The vehicle may be brought to a stop by the driver previous to passing magnet $D_{15}$ and until home signal H clears up and energizes magnets $D_{15}$ and $D_{16}$ when the driver may proceed and will be permitted to pick up full speed in passing magnets $D_{15}$ and $D_{16}$.

We have shown contacts 21 and 22 as being adapted to be closed by a contact piece 88 carried by but insulated from stop arm 30.

While the invention has been illustrated in one of its applications, it may be embodied in other structures without departing from the spirit of the invention and we do not limit ourselves therefore to any of the details of the structures shown in the drawings further than is demanded by the scope of the appended claims.

We claim:

1. In an automatic train control, a vehicle, a speed indicating hand, a stop hand, an air brake control, means for moving the speed indicating hand and the stop hand controlled by the movement of the vehicle, a speed limit hand in the path of movement of the speed indicating hand and the stop hand capable of being moved toward the speed indicating hand by the stop hand, means for restoring the stop hand to its zero position and for restoring the speed limit hand to its maximum speed position controlled by the track condition and means actuated by the speed limit hand for operating the air brake control.

2. In an automatic train control, a vehicle, a speed indicating hand, a stop hand, an air brake control, means for moving the speed indicating hand and the stop hand controlled by the movement of the vehicle, a speed limit hand in the path of movement of the speed indicating hand and the stop hand capable of being moved toward the speed indicating hand by the stop hand, means independent of the track conditions for holding the speed limit hand in the position to which it has been moved by the stop hand, means for restoring the stop hand to its zero position and for restoring the speed limit hand to its maximum speed position controlled by the track condition and means actuated by the speed limit hand for operating the air brake control.

3. In an automatic train control, a vehicle, a stop hand, a speed limit hand in the path of movement of the stop hand and capable of being moved in one direction by the stop hand, means for actuating the stop hand comprising a device controlled in its movement by the movement of the vehicle, magnets spaced from each other along the track, means on the vehicle responsive to the magnetic flux for restoring the stop hand to its zero position and means for restoring the speed limit hand to its maximum speed position controlled by the position of the stop hand when responding to the magnetic flux.

4. In an automatic train control, a vehicle, a stop hand, a speed limit hand in the path of movement of the stop hand and capable of being moved in one direction by the stop hand, means for actuating the stop hand comprising a device controlled in its movement by the movement of the vehicle, magnets spaced from each other along the track, means on the vehicle responsive to the magnetic flux for restoring the stop hand to its zero position on passing each such magnet and means for restoring the speed limit hand to its maximum speed position controlled by the synchronizing of the position of the stop hand with the spacing of said magnets.

5. In an automatic train control, a vehicle, a speed indicating hand, a stop hand, an air brake control, means for moving the speed indicating hand and the stop hand controlled by the movement of the vehicle, a speed limit hand in the path of movement of the speed indicating hand and the stop hand capable of being moved toward the speed indicating hand by the stop hand, electromagnets and permanent magnets in each block spaced from each other along the track, the electromagnets being controlled by the track conditions, means on the vehicle responsive to the magnetic flux for restoring the stop hand to its zero position on passing each magnet and means actuated by the speed limit hand for operating the air brake control.

6. In an automatic train control, a vehicle, a speed indicating hand, a stop hand, an air brake control, means for moving the speed indicating hand and the stop hand controlled by the movement of the vehicle, a speed limit hand in the path of movement of the speed indicating hand and the stop hand capable of being moved toward the speed indicating hand by the stop hand, electromagnets and permanent magnets spaced from each other along the track, the permanent magnets being independent of track conditions, means on the vehicle responsive to the magnetic flux for restoring the stop hand to its zero position on passing each magnet, one of said electromagnets in a block being spaced to restore the stop hand to its zero position after it has advanced the speed limit hand to a predetermined speed limiting position and a permanent magnet at the end of the same block adapted to restore the stop hand normally to its zero position.

7. In an automatic train control, a vehicle, a speed indicating hand, a stop hand, an air brake control, means for moving the speed indicating hand and the stop hand controlled by the movement of the vehicle, a speed limit hand in the path of movement of the speed indicating hand and the stop hand capable of being moved toward the speed indicating hand by the stop hand, electromagnets spaced each other along the track, a home signal controlling said electromagnets, means on the vehicle responsive to the magnetic flux for restoring the stop hand to its zero position, means for restoring the speed limit hand to its maximum speed position controlled by the position of the stop hand when responding to the magnetic flux and means actuated by the speed limit hand for operating the air brake control when the home signal is at danger and the electromagnets of the block are de-energized.

In testimony whereof we have signed this specification.

THOMAS W. VARLEY.
WILLIAM C. NEIN.